(12) United States Patent
Mizuta

(10) Patent No.: US 12,551,951 B2
(45) Date of Patent: Feb. 17, 2026

(54) COMBINED WORKING MACHINE

(71) Applicant: FUJI CORPORATION, Chiryu (JP)

(72) Inventor: Kenji Mizuta, Kasugai (JP)

(73) Assignee: FUJI CORPORATION, Chiryu (JP)

( * ) Notice: Subject to any disclaimer, the term of this patent is extended or adjusted under 35 U.S.C. 154(b) by 493 days.

(21) Appl. No.: 18/041,581

(22) PCT Filed: Oct. 28, 2020

(86) PCT No.: PCT/JP2020/040472
§ 371 (c)(1),
(2) Date: Feb. 14, 2023

(87) PCT Pub. No.: WO2022/091260
PCT Pub. Date: May 5, 2022

(65) Prior Publication Data
US 2023/0286057 A1    Sep. 14, 2023

(51) Int. Cl.
| B23B 29/24 | (2006.01) |
| B23B 11/00 | (2006.01) |
| B23P 23/02 | (2006.01) |

(52) U.S. Cl.
CPC ............. B23B 29/24 (2013.01); *B23B 11/00* (2013.01); *B23P 23/02* (2013.01)

(58) Field of Classification Search
CPC ......... B23B 3/168; B23B 11/00; B23B 29/24; B23Q 7/04; B23Q 7/1494; B23Q 2701/01; Y10T 29/5109; Y10T 29/5114; Y10T 82/2524; Y10T 483/1705
See application file for complete search history.

(56) References Cited

U.S. PATENT DOCUMENTS

| 2002/0014139 A1* | 2/2002 | Hirose | B23B 3/168 |
| | | | 82/121 |
| 2002/0066342 A1* | 6/2002 | Baumann | B23Q 39/026 |
| | | | 82/117 |
| 2012/0152069 A1 | 6/2012 | Hyatt et al. | |

FOREIGN PATENT DOCUMENTS

| JP | 1-234101 A | 9/1989 |
| JP | 4-87748 A | 3/1992 |
| JP | 4-131909 A | 5/1992 |

(Continued)

OTHER PUBLICATIONS

International Search Report issued Dec. 22, 2020 in PCT/JP2020/040472 filed on Oct. 28, 2020, 3 pages.

*Primary Examiner* — Christopher J. Besler
(74) *Attorney, Agent, or Firm* — Oblon, McClelland, Maier & Neustadt, L.L.P.

(57) ABSTRACT

There is provided a combined working machine including: a bed in which a front inclined surface which is inclined forward is formed; a first workpiece main spindle device and a second workpiece main spindle device disposed on the front inclined surface of the bed to be opposite to each other and including a main spindle stand configured to rotatably hold a main spindle about an axis and a driving mechanism configured to move the main spindle in an axial direction of the main spindle; a first turret device and a second turret device including a turret configured to attach multiple turret tools disposed above the main spindle on the bed; and a tool main spindle device disposed between the first turret device and the second turret device on the bed and including a main spindle head configured to exchangeably and rotatably hold a main spindle head tool.

6 Claims, 10 Drawing Sheets

(56) References Cited

FOREIGN PATENT DOCUMENTS

| | | |
|---|---|---|
| JP | 6-344239 A | 12/1994 |
| JP | 2002-59301 A | 2/2002 |
| JP | 2003-62701 A | 3/2003 |
| JP | 2008-62357 A | 3/2008 |
| WO | WO 01/30522 A1 | 5/2001 |

* cited by examiner

COMBINED WORKING MACHINE

TECHNICAL FIELD

The present disclosure relates to a combined working machine having a structure suitable for space-saving.

BACKGROUND ART

Patent Literature 1 discloses a combined NC lathe (combined working machine) capable of performing working such as a machining center. This combined working machine is an opposed biaxial lathe having a tool spindle capable of exchanging a tool and a tool turret including multiple exchanging tools, and is for efficiently working workpieces in various shapes, from materials to finished products, on the same machine. Specifically, a left side main spindle and a right side main spindle facing each other on the same axis line are included, a left side turret and a right side turret are disposed on front lower sides of both main spindles, and further, a third tool rest is provided on a back upper side of both main spindles. The combined working machine of the conventional example is provided with a tool magazine for accommodating multiple tools to be used for the third tool rest, and an automatic tool exchanger for exchanging the tools in the tool rests.

Patent Literature

Patent Literature 1: International Publication No. WO2001/030522

BRIEF SUMMARY

Technical Problem

In the above-described combined working machine described as a conventional example, the multiple tools are attached in a circumferential direction to the tool rest of tool turret disposed on the left and right sides, so that various types of working on the workpiece can be performed by revolving indexing. In addition, the tool magazine is provided on the third tool rest to be able to handle various types of working, and various tools that can be exchanged with respect to the tool spindle are housed. The exchange of the tools with respect to the third tool rest is performed by the automatic tool exchanger. Meanwhile, since the automatic tool exchanger is provided on a bed together with each device such as a turret, the arrangement and configuration thereof are problematic in order to make the combined working machine installable in a space-saving manner. For example, in the above-described conventional example, the automatic tool exchanger is also mounted on the bed provided with the left and right main spindles, the turret, and the like, and is disposed at a rear left side of the bed. Accordingly, in order to perform a tool exchange with respect to the third tool rest, a structure for moving the tool rest to the automatic tool exchanger on the bed in which each device is disposed is provided, so that the combined working machine is increased in size by the same amount.

In order to solve the above-described problems, an object of the present disclosure is to provide a combined working machine having a structure suitable for space-saving.

Solution to Problem

According to one aspect of the present disclosure, there is provided a combined working machine including: a bed in which a front inclined surface which is inclined forward is formed; a first workpiece main spindle device and a second workpiece main spindle device disposed on the front inclined surface of the bed to be opposite to each other and including a main spindle stand configured to rotatably hold a main spindle about an axis and a driving mechanism configured to move the main spindle in an axial direction of the main spindle; a first turret device and a second turret device including a turret configured to attach multiple turret tools disposed above the main spindle on the bed; and a tool main spindle device disposed between the first turret device and the second turret device on the bed and including a main spindle head configured to exchangeably and rotatably hold a main spindle head tool.

Advantageous Effects

With the configuration described above, the first workpiece main spindle device and the second workpiece main spindle device are disposed to be opposite to each other on the front inclined surface, the first turret device and the second turret device are disposed on the bed behind, and further, each device is housed in a compact manner on the bed with a configuration in which the tool main spindle device is disposed on the bed between the first and second turret devices, so that an installation area of the combined working machine can be reduced in space.

DESCRIPTION OF EMBODIMENTS

Figure 1:
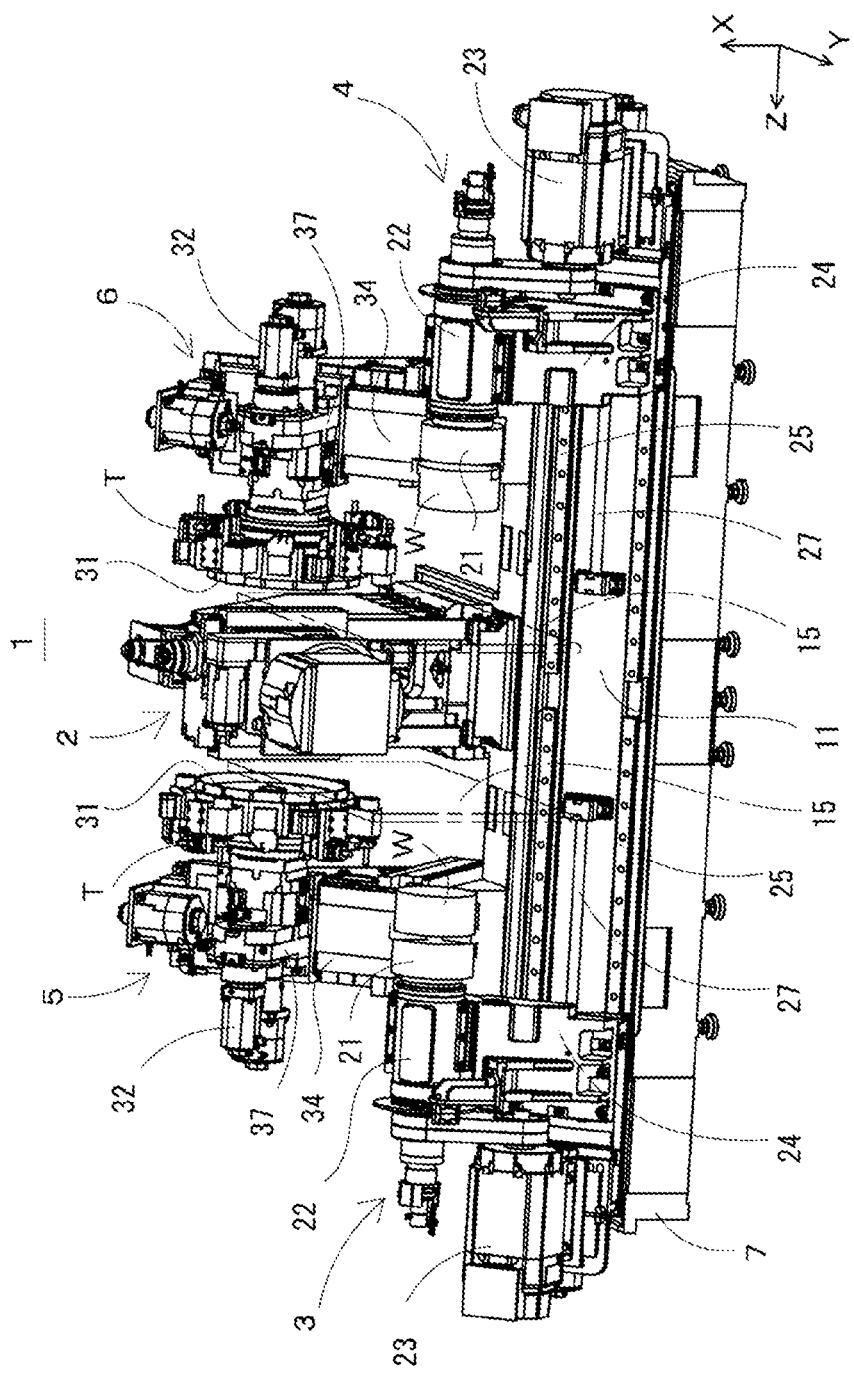
FIG. 1 is a perspective view illustrating a main structure of a combined working machine.
Figure 2:
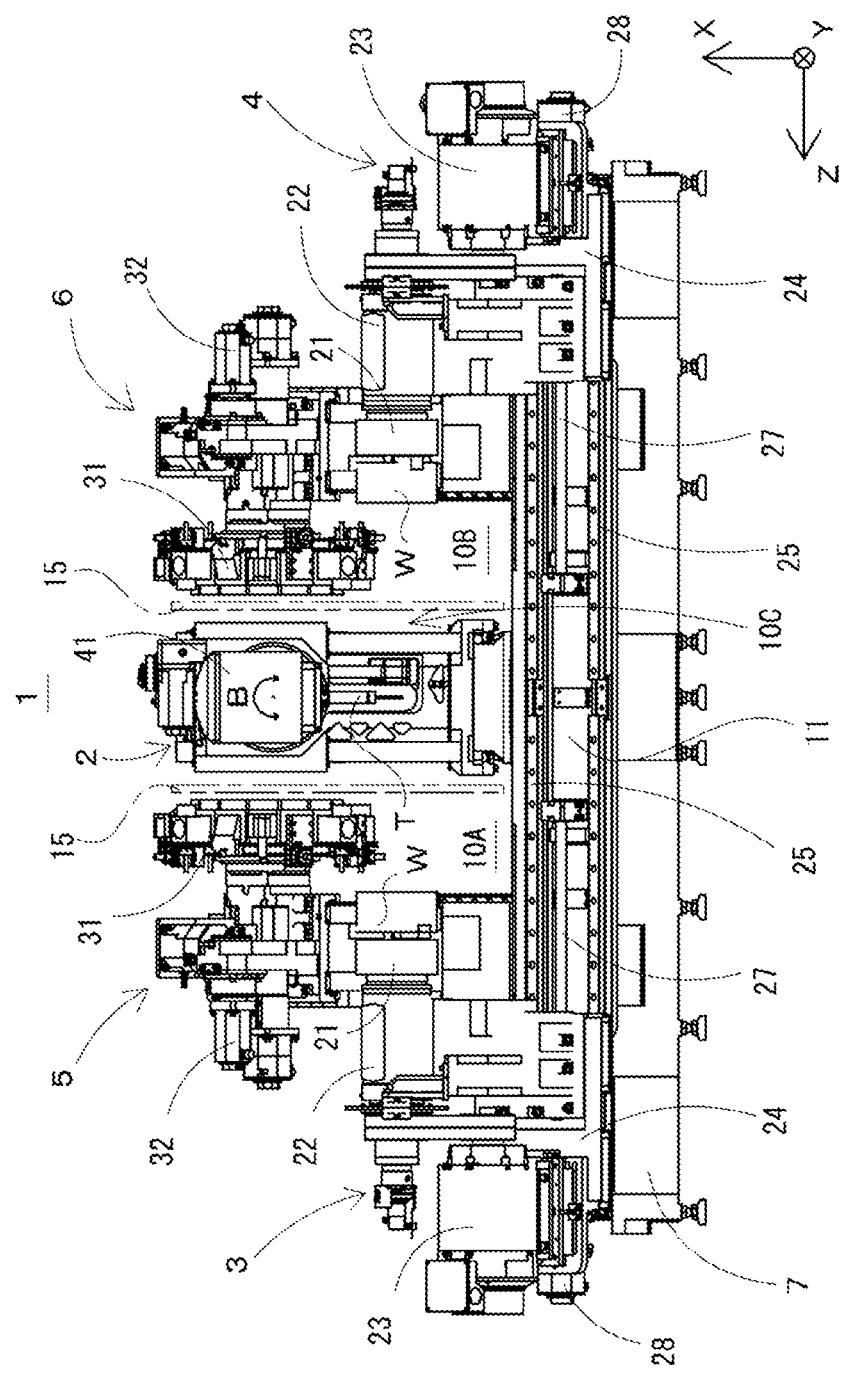
FIG. 2 is a front view illustrating the main structure of the combined working machine.
Figure 3:
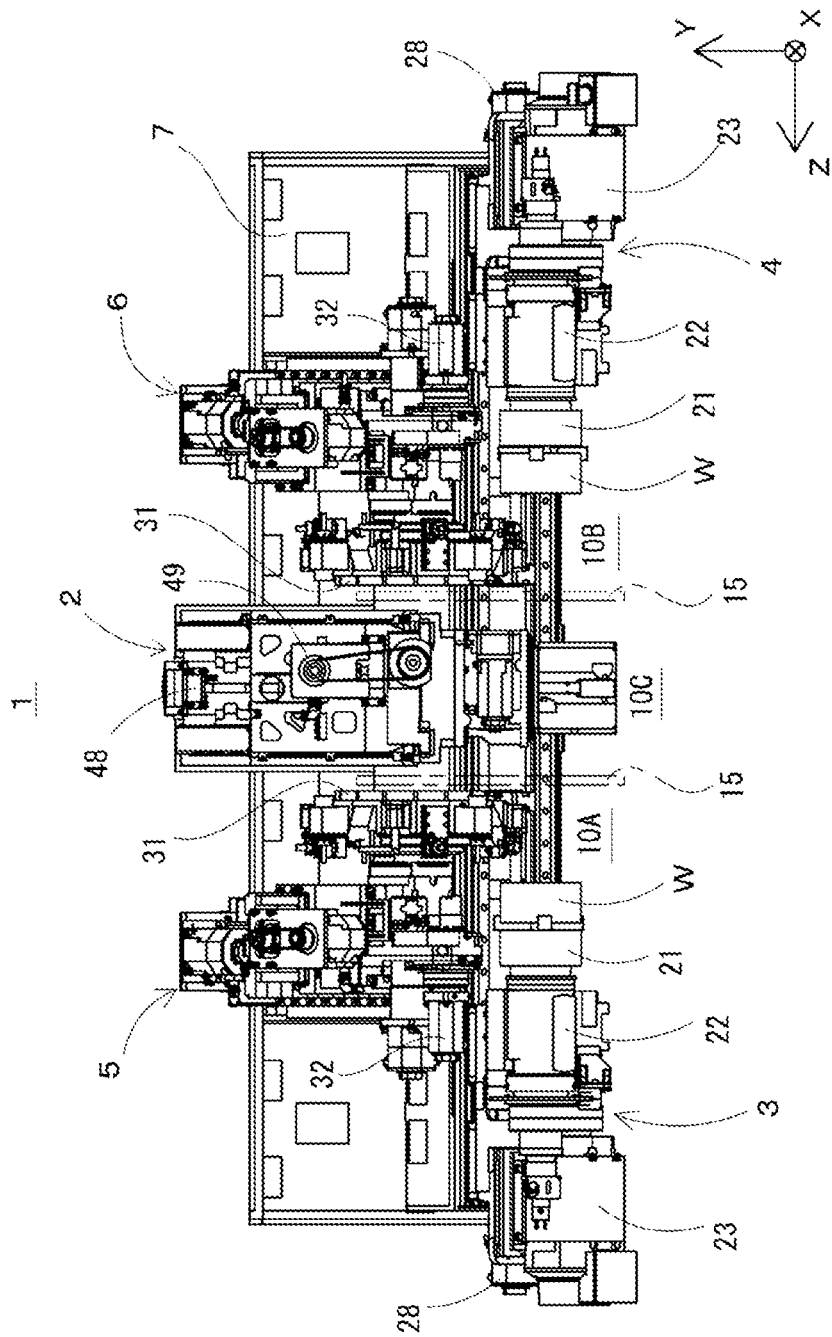
FIG. 3 is a plan view illustrating the main structure of the combined working machine.
Figure 4:
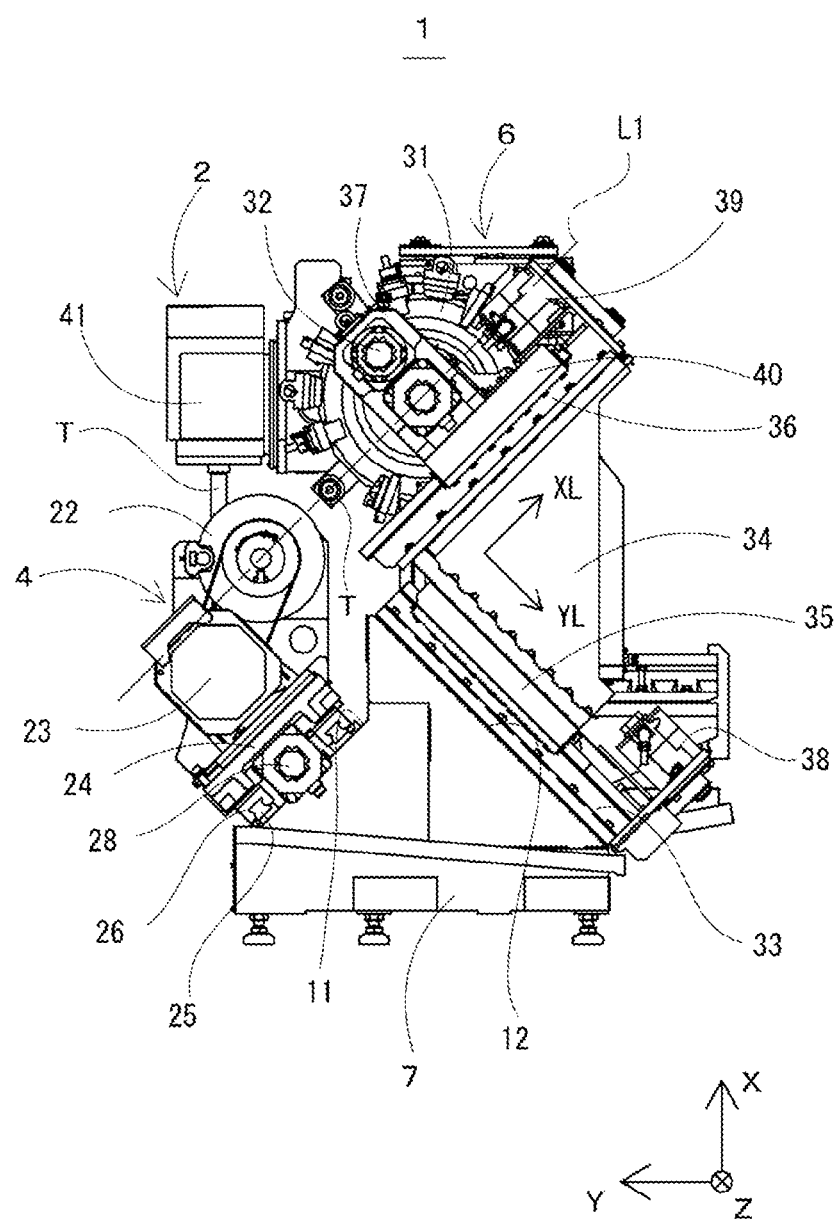
FIG. 4 is a side view illustrating the main structure of the combined working machine.

An embodiment of a combined working machine according to the present disclosure will be described below with reference to the drawings. The combined working machine according to the present embodiment is a machine tool having both functions of an NC lathe and a machining center in the same manner as the conventional example. FIG. 1, FIG. 2, FIG. 3, and FIG. 4 are a perspective view, a front view, a plan view, and a side view illustrating a main structure of the combined working machine according to the present embodiment. In combined working machine 1, in addition to an opposed biaxial lathe in which first workpiece main spindle device 3 and second workpiece main spindle device 4 that impart rotation to gripped workpiece W, and first turret device 5 and second turret device 6 having multiple tools T (turret tool) corresponding to working on workpiece W are respectively disposed symmetrically with respect to a left-right direction, tool main spindle device 2 for executing working difficult in the lathe is provided at a machine body center.

In combined working machine 1, first workpiece main spindle device 3 and second workpiece main spindle device 4, first turret device 5 and second turret device 6, and tool main spindle device 2 are mounted on one bed 7. In particular, combined working machine 1 has a compact configuration so as to achieve space-saving. Specifically, first workpiece main spindle device 3 and second workpiece main spindle device 4 are disposed on a machine body front side, and first turret device 5 and second turret device 6 are disposed behind first workpiece main spindle device 3 and second workpiece main spindle device 4. In combined working machine 1, in addition to the opposed biaxial lathe, tool main spindle device 2 is disposed at the machine body center so as to be sandwiched between first turret device 5 and second turret device 6.

First workpiece main spindle device 3 and second workpiece main spindle device 4 are designed such that a center line of a main spindle is in a machine body width direction and is horizontal, and the movement direction is in a Z-axis direction parallel to the main spindle. Both first and second turret devices 5 and 6 and tool main spindle device 2 move in a machine body front-rear direction and a machine body up-down direction orthogonal to the main spindle (Z-axis). In particular, the movement direction of tool main spindle device 2 is an X-axis perpendicular to a horizontal Y-axis, whereas the movement directions of first and second turret devices 5 and 6 are a YL-axis and an XL-axis inclined by 45 degrees with respect to the Y-axis and the X-axis.

In combined working machine 1, in order to suppress the dimensions in the machine body front-rear direction, bed 7 has a slant bed structure, a mounting surface of first and second workpiece main spindle devices 3 and 4 is front inclined surface 11 which is made lower in front, and conversely, a mounting surface of first and second turret devices 5 and 6 disposed on a machine body rear side is rear inclined surface 12 which is made lower in rear. Front inclined surface 11 is formed at a low position and rear inclined surface 12 is formed at a high position such that the disposition of the entire device is inclined forward.

First and second workpiece main spindle devices 3 and 4 (hereinafter, referred to as workpiece main spindle devices 3 and 4 in a case where both devices are commonly described) have the same structure, a spindle is rotatably incorporated in cylindrical main spindle stand 22, and chuck mechanism 21 for gripping and releasing workpiece W as a working target is assembled to main spindle stand 22. A belt is bridged over the spindle via a pulley with a rotation axis of spindle motor 23, so that phase determination at a time of working or rotation at a predetermined speed with respect to workpiece W gripped by chuck mechanism 21 is imparted.

Workpiece main spindle devices 3 and 4 are provided with a driving mechanism in which main spindle stand 22 or spindle motor 23 is mounted on main spindle slide 24 such that front inclined surface 11 of bed 7 is moved in the Z-axis direction. Two guide rails 25 parallel to the Z-axis are fixed to front inclined surface 11, and guide block 26 fixed to a lower surface of main spindle slide 24 slidably meshes with guide rail 25. A lower surface of main spindle slide 24 is aligned with an angle of front inclined surface 11, and is mounted on the up-down side such that main spindle stand 22 and spindle motor 23 do not greatly project from front inclined surface 11 toward the front side.

Workpiece main spindle devices 3 and 4 can be moved in the Z-axis direction by a ball screw mechanism, and screw shaft 27 parallel to the Z-axis is supported between two guide rails 25 via a bearing. Z-axis servo motor 28 is provided on the outside in the machine body width direction, and a rotation axis of Z-axis servo motor 28 is connected to screw shaft 27. On the other hand, a nut member through which screw shaft 27 passes is fixed to main spindle slide 24, so that main spindle slide 24 is configured to linearly move in the Z-axis direction by the rotational output of Z-axis servo motor 28.

Next, first turret device 5 and second turret device 6 (hereinafter, turret devices 5 and 6 in a case where both devices are commonly described) select corresponding tool T from multiple tools T by revolving indexing, and perform predetermined working such as cutting on workpiece W. Turret devices 5 and 6 are configured such that multiple tools T are attached to disk-shaped turret 31 at equal intervals in a circumferential direction, and arbitrary tool T can be positioned at a working position on the circumference by rotational control of indexing servomotor 32. Tool T of turret 31 is attached such that a tip end of a bite, a drill, or the like faces an outside in the machine body width direction. Accordingly, at a time of working, workpiece main spindle devices 3 and 4 are moved in the Z-axis direction, so that tool T abuts onto facing workpiece W from the machine body center side.

In order to move tool T to the working position, turret devices 5 and 6 are provided with a driving mechanism such that turret 31 is moved on an XY-plane orthogonal to the Z-axis, in the YL-axis direction and the XL-axis direction having an angle of 45 degrees with respect to the horizontal direction and the vertical direction. Rear inclined surface 12 parallel to the YL-axis is formed on bed 7, and YL-axis guide rail 33 is fixed thereto. Base slide 34 in a substantially triangular shape is provided with guide section 35 on one side thereof for sliding YL-axis guide rail 33, and an adjacent side at 90 degrees is a mounting surface of turret 31, on which XL-axis guide rail 36 is provided. Guide section 40 of turret slide 37 slidably meshes with XL-axis guide rail 36.

A ball screw mechanism is provided on base slide 34 and turret slide 37. A screw shaft parallel to each of YL-axis guide rail 33 and XL-axis guide rail 36 is supported by a bearing, and the screw shaft passes through a nut member fixed to base slide 34 or turret slide 37. Each screw shaft is connected to a rotation axis of YL-axis servo motor 38 or XL-axis servo motor 39. Accordingly, turret devices 5 and 6 can perform not only the movement control in each direction of the YL-axis and the XL-axis of turret 31 by the drive control of YL-axis servo motor 38 and XL-axis servo motor 39, but also the movement control in the horizontal direction in which the movements in both axial directions are combined.

Figure 5:
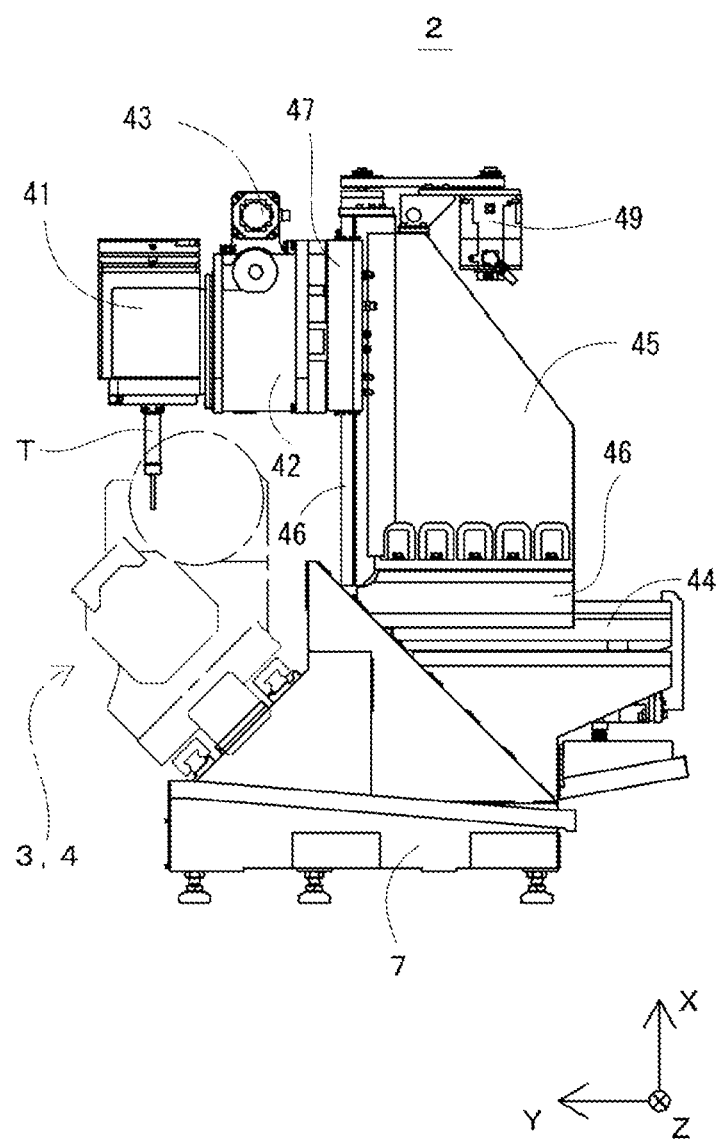
FIG. 5 is a side view illustrating a tool main spindle device.

Next, FIG. 5 is a side view illustrating tool main spindle device 2. Tool main spindle device 2 can perform workpiece working at a depth or an angle, which cannot be performed by turret devices 5 and 6. In tool main spindle device 2, a servomotor for a main spindle and a tool spindle are built in main spindle head 41, and various tools T (main spindle head tools) housed in an automatic tool exchanger 8 (refer to FIG. 8) are replaced with a tool attachment portion provided at a lower end portion of main spindle head 41. Main spindle head 41 is configured to be rotatably attached to main spindle slide 42, and transmit the rotation of B-axis motor 43 via a rotation transmission mechanism.

In order to move tool T to the working position, tool main spindle device 2 is provided with a driving mechanism of moving main spindle head 41 in a horizontal Y-axis direction and a vertical X-axis direction. Horizontal guide rail 44 is fixed on bed 7, and guide section 46 of base slide 45 slidably meshes with guide rail 44. Base slide 45 is configured with vertical rail portion 46 on a front side, and guide section 47 of main spindle slide 42 slidably meshes with rail portion 46. Both base slide 45 and main spindle slide 42 are provided with a ball screw mechanism. Y-axis servo motor 48 (refer to FIG. 3) or X-axis servo motor 49 is connected by passing a screw shaft in each direction through a nut member fixed to base slide 45 or main spindle slide 42.

In combined working machine 1, it is possible to simultaneously perform working on workpiece W with first workpiece main spindle device 3 and second workpiece main spindle device 4, and also perform tool exchange in tool main spindle device 2. Therefore, two separation shutters 15 are provided such that each device is not affected by coolant, chips, or the like. Separation shutter 15 is disposed on both sides in the width direction of tool main spindle device 2, and is configured to be horizontally moved in the machine body front-rear direction by the driving mechanism. Combined working machine 1 can be divided by separation shutter 15 into first working chamber 10A formed by first workpiece main spindle device 3 and turret device 5, second working chamber 10B formed by second workpiece main spindle device 4 and second turret device 6, and tool exchange chamber 10C performed on tool main spindle device 2. By closing only one separation shutter 15, a cavity including tool exchange chamber 10C can be first working chamber 10A or second working chamber 10B.

Figure 6:
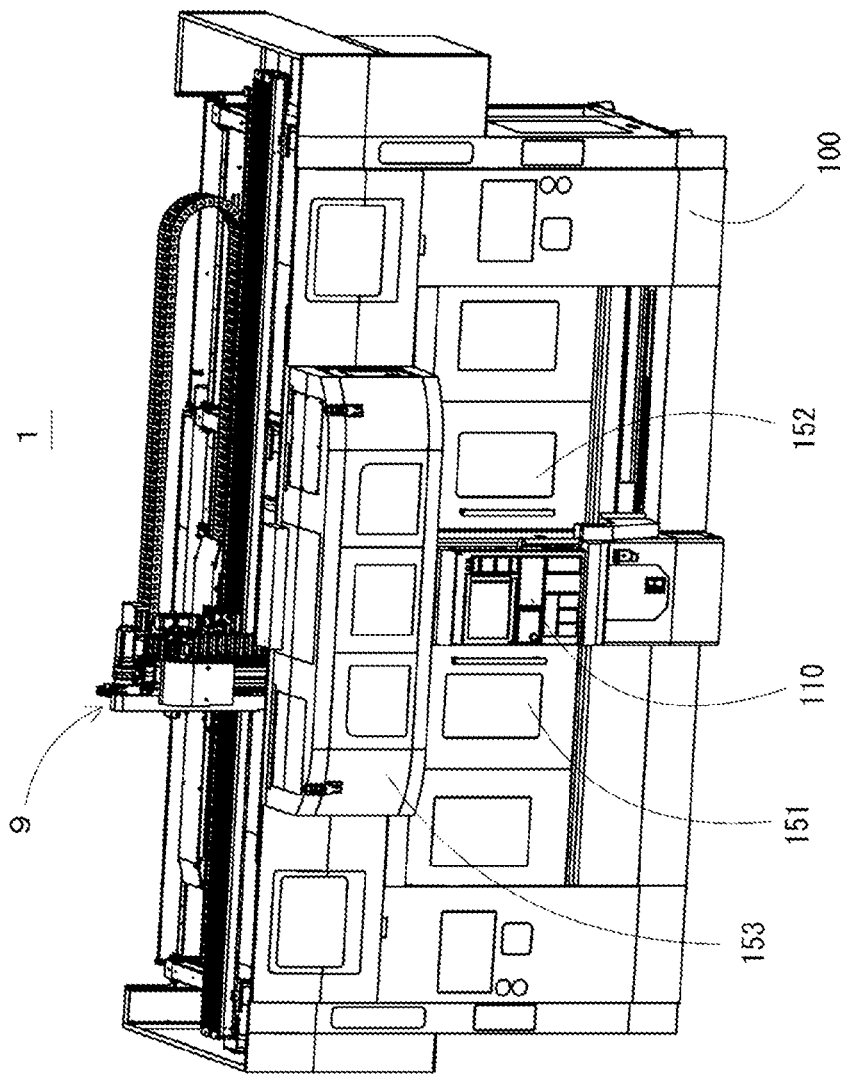
FIG. 6 is an appearance perspective view of the combined working machine.

Next, FIG. 6 is an appearance perspective view of entire combined working machine 1. In combined working machine 1, not only first workpiece main spindle device 3 or the like on bed 7 but also automatic tool exchanger 8 or workpiece automatic conveyance device 9 are covered by machine body cover 100 as illustrated in FIG. 6. Gantry-type workpiece automatic conveyance device 9 is provided so as to project upward from machine body cover 100, and is configured to move gripped workpiece W in three axial directions in an inside of the machine body. Operation panel 110 is provided at a center of a machine body front surface, and left front door 151 and right front door 152 are formed on both left and right sides of operation panel 110. Tool main spindle device 2 is located behind operation panel 110, and first and second working chambers 10A and 10B are located behind left front door 151 and right front door 152. Automatic tool exchanger 8 is disposed such that tool magazine 71 (refer to FIG. 8) projects ahead of left and right front doors 151 and 152 on the machine body front surface, and is covered by magazine cover 153.

Figure 7:
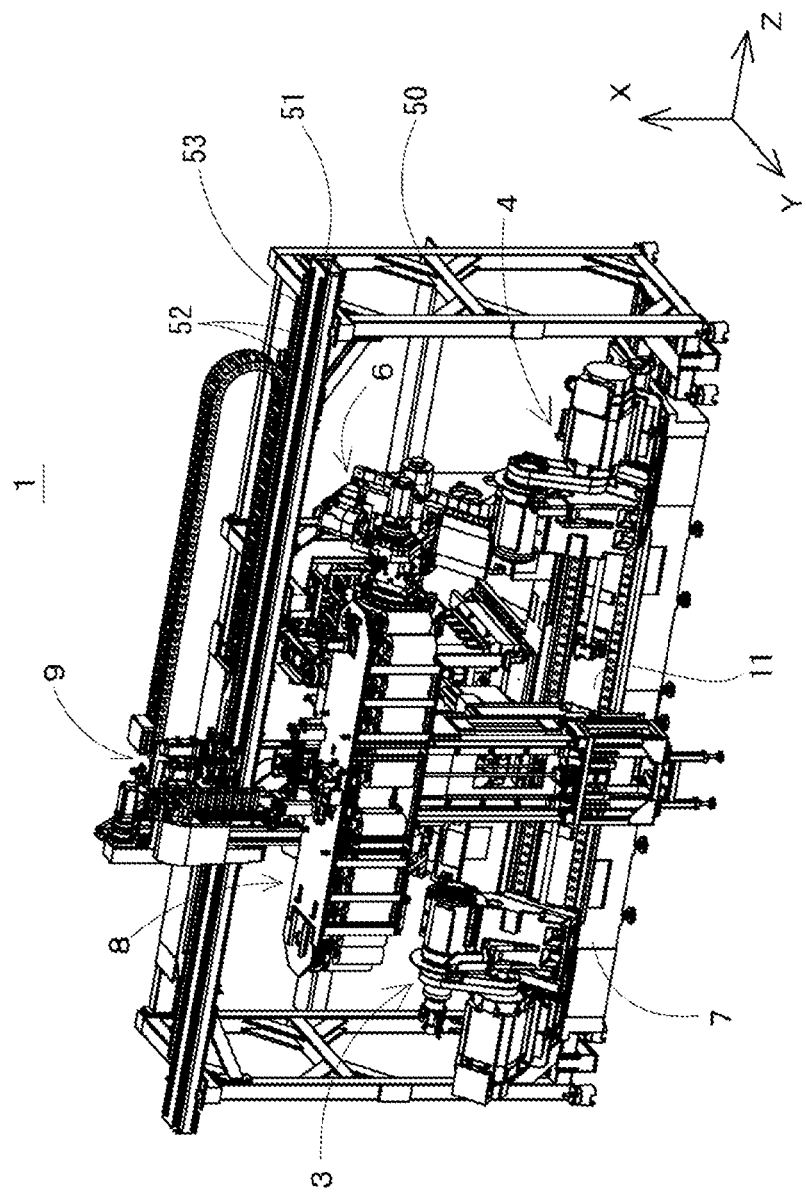
FIG. 7 is a perspective view illustrating the combined working machine in which a machine body cover is removed.
Figure 8:
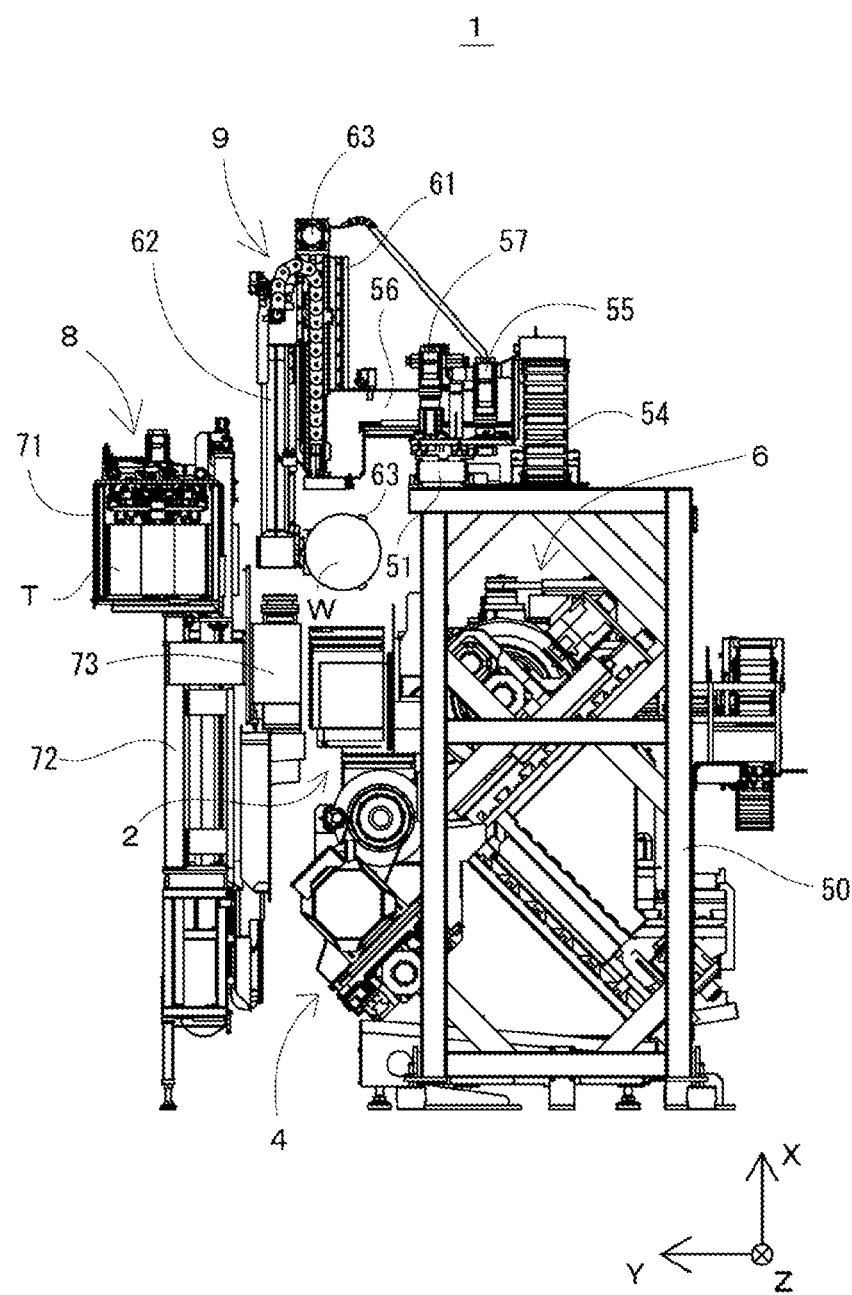
FIG. 8 is a side view illustrating the combined working machine in which the machine body cover is removed.

Here, FIGS. 7 and 8 are a perspective view and a side view illustrating combined working machine 1 in which machine body cover 100 is removed. Combined working machine 1 is configured with turret-shaped frame structure 50 in which front, rear, left, and right beams are spliced to front, rear, left, and right columns erected in accordance with a width of bed 7, and each device on bed 7 such as tool main spindle device 2, automatic tool exchanger 8, and workpiece automatic conveyance device 9 are covered with machine body cover 100. In workpiece automatic conveyance device 9, rail base 51 having two traveling rails 52 in the machine body width direction and one traveling rack 53 on frame structure 50 is fixed on a machine body front side, and traveling table 54 slidable along traveling rail 52 is provided on rail base 51. Traveling motor 55 is fixed to traveling table 54, and a pinion fixed to a rotation axis of traveling motor 55 meshes with traveling rack 53, so that movement in the machine body width direction can be performed.

A slide member is fixed to an upper surface of traveling table 54, a slide rail that slides on the slide member, and slide base 56 that moves in the machine body front-rear direction is provided. A front-rear movement rack is fixed to a side face of slide base 56, and front-rear motor 57 is fixed to traveling table 54 via a bracket. Accordingly, the pinion fixed to the rotation axis of front-rear motor 57 meshes with the front-rear movement rack, so that slide base 56 can be moved in the front-rear direction. Slide base 56 projects from machine body frame 50 toward the front side, and lifting and lowering arm 62 that moves up and down is configured at a tip end portion of slide base 56.

Supporting column 61 provided with a lifting and lowering rail is fixed in a vertical posture to a front end portion of slide base 56, and lifting and lowering arm 62 provided with a slide member is configured to be moved along the lifting and lowering rail. Lifting and lowering motor 63 is fixed to a top portion of supporting column 61, and a belt is bridged between a pulley fixed to the rotation axis of lifting and lowering motor 63 and a pulley pivotally supported by a lower portion of supporting column 61. Lifting and lowering arm 62 is connected to the belt, so that lifting and lowering motor 63 can be driven to position the belt in the height direction. Pair of chuck mechanisms 21 are assembled to a lower end portion of lifting and lowering arm 62 in a state of being reversible by a turning motor.

Figure 9:
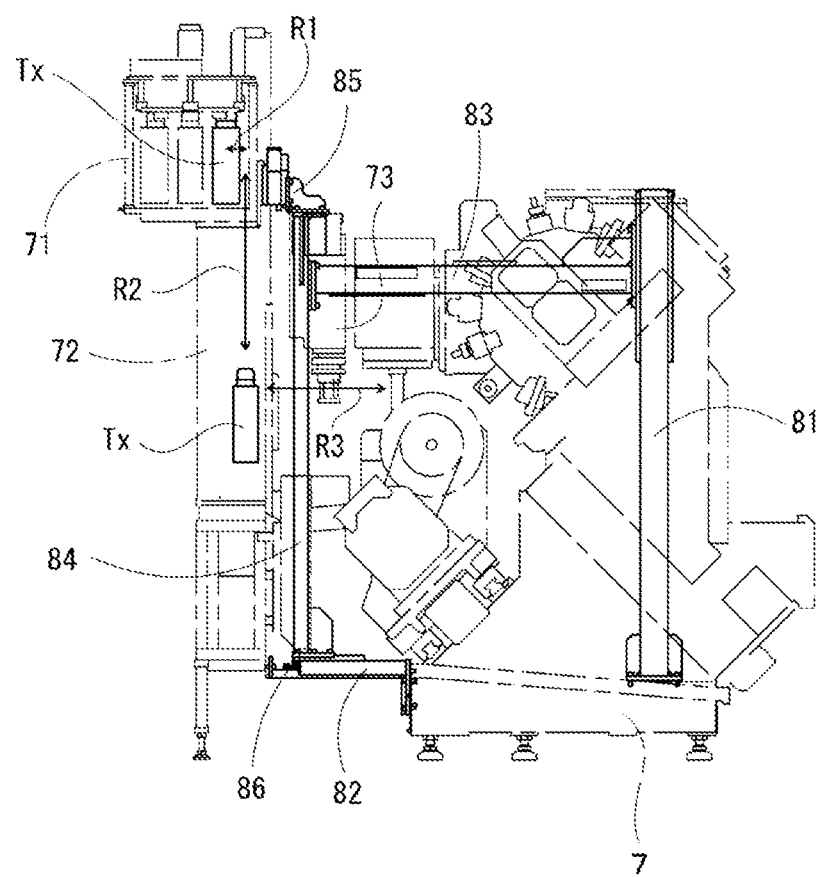
FIG. 9 is a side view illustrating a supporting structure of an automatic tool exchanger.

Next, in combined working machine 1, automatic tool exchanger 8 for tool exchange with respect to tool main spindle device 2 is provided on a machine body front surface portion. Automatic tool exchanger 8 has tool magazine 71 housing multiple tools T for exchange at an upper portion thereof, and is supported by exchanger main body 72 standing on tool magazine 71. Meanwhile, since automatic tool exchanger 8 cannot be self-supporting by only two-legged exchanger main body 72, automatic tool exchanger 8 is connected to bed 7 by a supporting structure illustrated in FIG. 9. In the supporting structure, support column 81 is fixed to a width direction end portion of bed 7, and horizontal lower beam member 82 is fixed to a front surface portion of bed 7. A cross beam is fixed between two support columns 81, two horizontal upper beam members 83 are fixed to a center portion thereof at a position at which tool main spindle device 2 is sandwiched, and lower beam member 82 and upper beam member 83 are connected by front column 84. Automatic tool exchanger 8 is connected via upper bracket 85 of front column 84 and lower bracket 86 of lower beam member 82.

In automatic tool exchanger 8, tool magazine 71 is mounted on an upper portion of erected exchanger main body 72, tool changer 73 for exchanging tool T is provided on tool main spindle device 2 side, and a shift device for moving tool T is configured in exchanger main body 72. In tool magazine 71, a roller chain is bridged so as to form an oval shape elongated in the machine body width direction, and tool T is detachably attached thereto. Tool magazine 71 has an indexing position at a center in the machine body width direction, and tool Tx positioned there follows paths (R1, R2, and R3) as indicated by arrows in FIG. 9, so that tool exchange in tool main spindle device 2 is performed.

The shift device has a front-rear shifter capable of transferring tool Tx with tool magazine 71 and moving gripped tool Tx to horizontal portion R1 by a cylinder, and an up-down shifter capable of transferring tool Tx with the front-rear shifter and moving gripped tool Tx to vertical portion R2 by a ball screw mechanism. Tool Tx lowered by the up-down shifter is transferred with tool changer 73. Tool changer 73 is configured with a chuck mechanism at both end portions of a revolving arm, and moves tool Tx by revolving by 180°. By moving tool Tx to revolving portion R3, tool exchange for main spindle head 41 can be performed.

In combined working machine 1, workpiece W is worked by the following flow. Workpiece W of an input side stocker is conveyed to first workpiece main spindle device 3 by workpiece automatic conveyance device 9, and is gripped by chuck mechanism 21. In first turret device 5, tool T selected by the driving of turret 31 is moved on working movement line L1 parallel to the YL-axis, and is positioned at a working position with respect to workpiece W. In first workpiece main spindle device 3, workpiece W gripped by chuck mechanism 21 is rotated by the driving of spindle motor 23 and main spindle slide 24 is moved in the Z-axis direction along guide rail 25, so that tool T abuts onto workpiece W to perform predetermined working.

In the first working of workpiece W by first workpiece main spindle device 3, in addition to working by first turret device 5, working with addition of tool main spindle device 2 or working by only tool main spindle device 2 is performed. In a case where working is performed on workpiece W by tool main spindle device 2, turret 31 is separated from first workpiece main spindle device 3. Tool main spindle device 2 is positioned by the movements in the Y-axis direction and the X-axis direction, and an angle of tool T is adjusted by the rotation of main spindle head 41 along the B-axis.

Next, in order to transfer workpiece W from first workpiece main spindle device 3 to second workpiece main spindle device 4, both devices approach the machine body center, second workpiece main spindle device 4 picks up workpiece W with respect to first workpiece main spindle device 3 which is stopped previously, and workpiece W is gripped and exchanged by chuck mechanisms 21. In second workpiece main spindle device 4, second working by second turret device 6 is executed on workpiece W in the same manner as first working, or working by tool main spindle device 2 is performed, or the working by tool main spindle device 2 alone is performed. Workpiece W with which the second working is completed is taken out by workpiece automatic conveyance device 9, and is collected in an output side stocker.

Combined working machine 1 of the present embodiment is configured such that first workpiece main spindle device 3 and second workpiece main spindle device 4 are disposed on front inclined surface 11, first turret device 5 and second turret device 6 are disposed on rear inclined surface 12, and tool main spindle device 2 is disposed between first and second turret devices 5 and 6, and first turret device 5 and second turret device 6 move turret 31 to obliquely enter from a high position in the back of the machine body with respect to first workpiece main spindle device 3 and second workpiece main spindle device workpiece W moving only in the Z-axis direction, and tool main spindle device 2 is not moved in the Z-axis direction. Therefore, by reducing the dimensions of bed 7 having a slant bed structure in the front-rear direction, and by eliminating the movement in the Z-axis direction with respect to tool main spindle device 2 as with conventional art, each device is housed in bed 7 in a compact manner, so that an installation area of combined working machine 1 can be reduced in space.

Incidentally, in a case where workpiece W is transferred between first workpiece main spindle device 3 and the second workpiece main spindle device 4, it is necessary to avoid interference with turret 31 (tool T). Therefore, although first and second turret devices 5 and 6 retract turret 31 to the position illustrated in FIG. 4, in the present embodiment, turret 31 retreats at an angle of 45°, so that a movement distance of turret 31 can be reduced as compared with a structure in which turret 31 is retracted horizontally. This is because in the structure in which the movement of turret 31 in the machine body front-rear direction is horizontal, in order to enter workpiece W, turret 31 must generally be advanced to a position at which turret 31 and a center of a main spindle coincide with each other in the X-axis direction.

Figure 10:
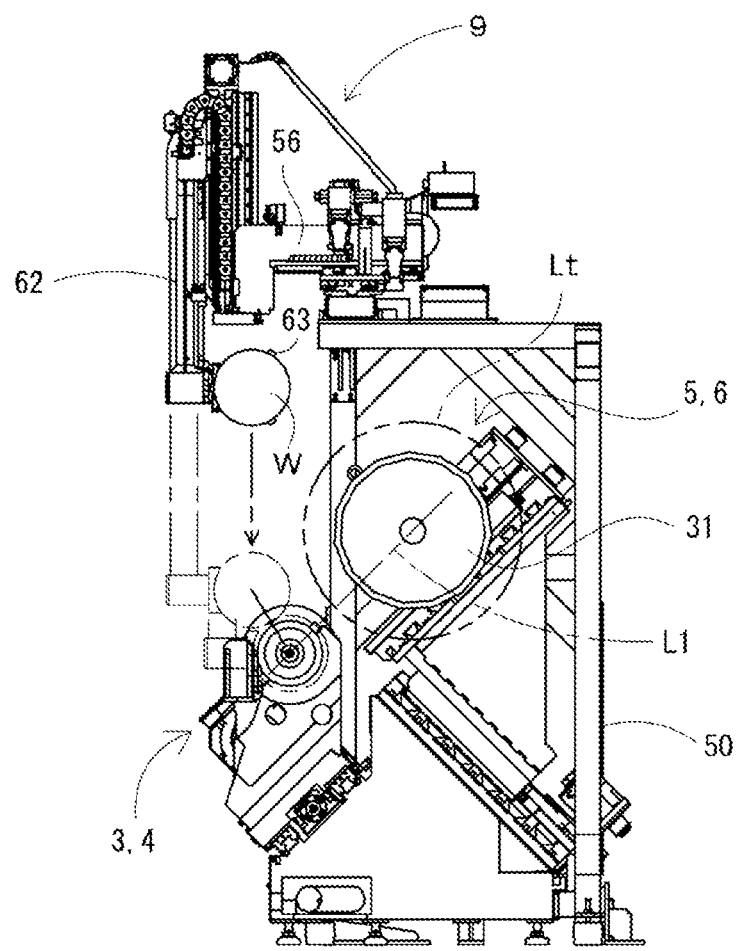
FIG. 10 is a side view illustrating a transfer of a workpiece in a workpiece automatic conveyance device.

In the transfer of workpiece W by workpiece automatic conveyance device 9, as illustrated in FIG. 10, chuck mechanism 21 or gripped workpiece W approach chuck mechanism 21 of first or second workpiece main spindle devices 3 and 4 by so-called wrapping as indicated by the arrows, which is returning to the rear side while the front side is lowered, so as not to abut onto tool T of turret 31 (so as not to overlap with interference line C1). Also in this case, turret 31 can avoid interference between turret 31 and chuck mechanism 63 or gripped workpiece W (tip end line Lt of tool T indicated by two-dot chain lines) even if turret 31 is moved by a short distance. In addition, although workpiece automatic conveyance device 9 can transfer workpiece W without being largely wrapped around by the retreating of turret 31, this eliminates the necessity of projecting slide base 56 greatly ahead, so that also in this respect, it contributes to space-saving in which the dimensions of combined working machine 1 in the machine body front-rear direction are suppressed.

In the present embodiment, automatic tool exchanger 8 for the tool exchange with respect to tool main spindle device 2 is provided in a machine body front portion, so that it is possible to install combined working machine 1 in a space-saving manner without increasing a size of combined working machine 1. In particular, automatic tool exchanger 8 has a configuration in which tool magazine 71 is installed so as to project ahead of the machine body at the front surface center upper portion of the machine body, and exchanger main body 72 is located behind operation panel 110 on the machine body front surface, and this contributes to the space-saving of entire combined working machine 1. In addition to the above effects, first and second turret devices 5 and 6 having tool T and tool main spindle device 2 are located at higher positions than first and second workpiece main spindle devices 3 and 4, so that combined working machine 1 can prevent shavings or coolant generated during working from falling on tool T, and a decrease in working accuracy caused by shavings adhering to tool T or the like can be prevented.

Although one embodiment of the present disclosure has been described, the present disclosure is not limited to these, and various modifications can be made without departing from the gist thereof. For example, tool main spindle device 2, first workpiece main spindle device 3, and the like are not limited to those having the configuration of the present embodiment.

REFERENCE SIGNS LIST

1: combined working machine, 2: tool main spindle device, 3: first workpiece main spindle device, 4: second workpiece main spindle device, 5: first turret device, 6: second turret device, 7: bed, 8: automatic tool exchanger, 9: workpiece automatic conveyance device, 10A: first working chamber, 10B: second working chamber, 10C: tool exchange chamber, 11: front inclined surface, 12: rear inclined surface, 21: chuck mechanism, 31: turret, 41: main spindle head, T: tool, W: workpiece

The invention claimed is:

1. A combined working machine comprising:
a bed in which a front inclined surface which is inclined forward in a front-rear direction of the working machine is formed;
a first workpiece main spindle device and a second workpiece main spindle device disposed on the front inclined surface of the bed to be opposite to each other, each of the first and second workpiece main spindle devices including a main spindle stand configured to rotatably hold a main spindle about an axis, each main spindle stand being mounted on a main spindle slide such that the first and second workpiece main spindle devices are movable in an axial direction of the main spindle perpendicular to the front-rear direction of the working machine;
a first turret device and a second turret device, each of the first and second turret devices including a turret configured to attach multiple turret tools respectively disposed above the main spindle of the first and second workpiece main spindle devices on the bed in an up-down direction of the working machine perpendicular to both the front-rear direction of the working machine and the axial direction of the main spindle, and respectively disposed behind the first and second workpiece main spindle devices in the front-rear direction of the working machine: and a tool main spindle device disposed between the first turret device and the second turret device on the bed and including a main spindle head configured to exchangeably and rotatably hold a main spindle head tool.

2. The combined working machine according to claim 1, wherein each turret of the first turret device and the second turret device is movable in two directions orthogonal to the axial direction of the main spindle,
the main spindle head is movable in two directions orthogonal to the axial direction of the main spindle, and
the two directions in which the turret is movable and the two directions in which the main spindle head is movable are different from each other.

3. The combined working machine according to claim 1, wherein the bed is formed with a rear inclined surface which is inclined rearward, and
the first turret device and the second turret device are disposed on the rear inclined surface.

4. The combined working machine according to claim 1, wherein the bed is formed with a horizontal surface, and
the tool main spindle device is disposed in the horizontal surface of the bed.

5. The combined working machine according to claim 1, wherein a workpiece automatic conveyance device having a traveling table movable in a machine body width direction parallel to the axial direction of the main spindle on a turret-shaped frame structure surrounding the bed, a slide base movable in a machine body front-rear direction on the traveling table, a lifting and lowering arm movable in an up-down direction on the slide base, and a chuck mechanism provided at a lower end portion of the lifting and lowering arm is incorporated.

6. The combined working machine according to claim 1, wherein an automatic tool exchanger having a tool magazine housing multiple main spindle head tools for exchange with respect to the main spindle head and disposed at a front surface upper portion of a machine body.

* * * * *